US010000602B2

(12) United States Patent
Nava et al.

(10) Patent No.: US 10,000,602 B2
(45) Date of Patent: Jun. 19, 2018

(54) CURABLE COMPOSITIONS

(71) Applicant: REICHHOLD LLC 2, Research Triangle Park, NC (US)

(72) Inventors: Hildeberto Nava, Cary, NC (US); William A. Schramm, Apex, NC (US); James Anthony Skrobacki, Garner, NC (US)

(73) Assignee: Reichhold LLC 2, Durham, NC (US)

( * ) Notice: Subject to any disclaimer, the term of this patent is extended or adjusted under 35 U.S.C. 154(b) by 27 days.

(21) Appl. No.: 14/858,604

(22) Filed: Sep. 18, 2015

(65) Prior Publication Data

US 2016/0096918 A1   Apr. 7, 2016

Related U.S. Application Data

(60) Provisional application No. 62/058,716, filed on Oct. 2, 2014.

(51) Int. Cl.

| *C08G 63/183* | (2006.01) |
| *C08G 63/16* | (2006.01) |
| *C08G 63/685* | (2006.01) |
| *C08K 5/00* | (2006.01) |
| *C08K 5/098* | (2006.01) |
| *C08K 5/17* | (2006.01) |
| *C08K 5/19* | (2006.01) |
| *C08K 5/50* | (2006.01) |
| *C08K 5/14* | (2006.01) |

(52) U.S. Cl.
CPC ........... *C08G 63/183* (2013.01); *C08G 63/16* (2013.01); *C08G 63/685* (2013.01); *C08K 5/0091* (2013.01); *C08K 5/098* (2013.01); *C08K 5/14* (2013.01); *C08K 5/17* (2013.01); *C08K 5/19* (2013.01); *C08K 5/50* (2013.01)

(58) Field of Classification Search
None
See application file for complete search history.

(56) References Cited

U.S. PATENT DOCUMENTS

| 2,740,765 A * | 4/1956 | Parker .................. C08F 283/01 |
| | | 525/11 |
| 3,091,936 A | 6/1963 | Lundberg et al. |
| 3,169,945 A | 2/1965 | Hostettler et al. |
| 3,338,876 A | 8/1967 | Kanavel et al. |
| 3,437,715 A | 4/1969 | Da Fano |
| 3,836,600 A | 9/1974 | Brewbaker et al. |
| 3,840,618 A | 10/1974 | Da Fano |
| 3,883,612 A | 5/1975 | Pratt et al. |
| 3,929,929 A | 12/1975 | Kuehn |
| 3,947,422 A | 3/1976 | Tatum et al. |
| 3,970,505 A | 7/1976 | Hauser et al. |
| 3,986,922 A | 10/1976 | Parker et al. |
| 4,012,542 A | 3/1977 | Oswitch et al. |
| 4,141,883 A | 2/1979 | Soma et al. |
| 4,182,830 A | 1/1980 | Ford, Jr. |
| 4,310,708 A | 1/1982 | Strege et al. |
| 4,324,717 A | 4/1982 | Layer |
| 4,380,605 A * | 4/1983 | Gallagher ......... C08F 299/0464 |
| | | 523/503 |
| 4,569,976 A | 2/1986 | Zimmerman et al. |
| 4,644,039 A | 2/1987 | Boyd et al. |
| 5,037,944 A | 8/1991 | Smaardijk et al. |
| 5,728,872 A | 3/1998 | Riemenschneider |
| 5,859,267 A | 1/1999 | Khattar et al. |
| 6,200,460 B1 | 3/2001 | Sutoris et al. |
| 7,173,074 B2 | 2/2007 | Mitra et al. |
| 7,498,367 B2 | 3/2009 | Qian |
| 8,008,380 B2 | 8/2011 | Koers et al. |
| 8,039,559 B2 | 10/2011 | Jansen et al. |
| 8,722,770 B2 | 5/2014 | Jansen et al. |
| 9,068,045 B2 | 6/2015 | Nava et al. |
| 2002/0007022 A1 | 1/2002 | Oosedo et al. |
| 2008/0207841 A1* | 8/2008 | Koers ....................... C08F 2/42 |
| | | 525/418 |
| 2008/0319138 A1 | 12/2008 | Kuang |
| 2010/0120977 A1* | 5/2010 | Koers .................. C08F 299/04 |
| | | 524/599 |
| 2013/0338317 A1 | 12/2013 | Jansen et al. |

FOREIGN PATENT DOCUMENTS

| JP | 57-179218 S | 11/1982 |
| WO | WO 90/12824 A1 | 11/1990 |
| WO | WO 01/40149 A2 | 6/2001 |
| WO | WO 01/40404 A1 | 6/2001 |
| WO | WO 01/42313 A1 | 6/2001 |

(Continued)

OTHER PUBLICATIONS

Notification of Transmittal of the International Search Report and the Written Opinion of the International Searching Authority, or the Declaration corresponding to International Application No. PCT/US2014/032312 dated Aug. 25, 2014.
Notification Concerning Transmittal of International Preliminary Report on Patentability corresponding to International Application No. PCT/US2014/032312 dated Oct. 15, 2015.
The Shepherd Chemical Company Unsaturated Polyester Resins https://www.shepcham.com/products/industry/unsaturated-polyester-resins.aspx Sep. 5, 2017; 2 pages.
Comar Chemicals (Pty) Ltd. Polyester Acceleration https://www.comarachemicals.com/index.php/en/products-en/other-organometallics-en/polyester-acceleration-en Sep. 5, 2017; 2 pages.

*Primary Examiner* — Christopher M Rodd
(74) *Attorney, Agent, or Firm* — Neal, Gerber & Eisenberg LLP

(57) ABSTRACT

The present invention relates generally to accelerators for the curing of thermosetting resins in the presence of metal compounds, quaternary ammonium and/or phosphonium salts, tertiary amines and/or phosphines and peroxide initiators, and methods of curing thermosetting resins using these accelerators.

10 Claims, No Drawings

(56) References Cited

FOREIGN PATENT DOCUMENTS

| | | |
|---|---|---|
| WO | WO 03/093384 A1 | 11/2003 |
| WO | WO 2005/042532 A1 | 5/2005 |
| WO | WO 2005/047379 A1 | 5/2005 |
| WO | WO 2006/128816 A1 | 12/2006 |
| WO | WO 2006/131295 A1 | 12/2006 |
| WO | WO 2008/119783 A1 | 10/2008 |
| WO | WO 2011/083309 A1 | 7/2011 |
| WO | WO 2011083309 A1 * 7/2011 ........... C08K 5/0025 |
| WO | WO 2011/124282 A1 | 10/2011 |
| WO | WO 2011/157673 A1 | 12/2011 |
| WO | WO 2012/126917 A1 | 9/2012 |
| WO | WO 2012/126918 A1 | 9/2012 |
| WO | WO 2012/126919 A1 | 9/2012 |
| WO | WO 2014/032710 A1 | 3/2014 |

\* cited by examiner

CURABLE COMPOSITIONS

RELATED APPLICATION

This application claims priority from U.S. Provisional Application Ser. No. 62/058,716, filed Oct. 2, 2014, the disclosure of which is hereby incorporated by reference herein in its entirety.

FIELD OF THE INVENTION

The present invention relates generally to accelerators for the curing of thermosetting resins in the presence of metal compounds, quaternary ammonium and/or phosphonium salts, tertiary amines and/or phosphines and peroxide initiators.

BACKGROUND OF THE INVENTION

Thermosetting resins used in casting or open and closed mold applications are typically cured by a free radical polymerization process. Examples of such thermosetting resin include unsaturated polyester resins, vinyl ester resins and urethane (meth)acrylates. The backbone of these resins either contain ethylenically unsaturated groups such as fumarate or (meth)acrylate and are dissolved in a liquid copolymerizable monomer such as styrene, methyl methacrylate or vinyl toluene. Such resins are liquid under normal conditions, though when treated with a source of free radicals such as an organic peroxide initiator an in the presence of a promoter will rapidly crosslink to form a hard thermoset crosslinked network. Such a process is used in the production of, for example, castings, coatings, adhesives and fiber reinforced articles.

Commercially available promoter systems for ambient cure thermosetting resins include accelerators or promoters used in conjunction with the initiator and include, for example, salts of metals chosen from among lithium, calcium, copper, vanadium, zirconium, titanium, nickel, iron, sodium, potassium, magnesium, manganese, barium and cobalt, in combination with one or more compounds of alkyl organic acids, halides, nitrates to form a coordination compound. The choice of the metal ion of metal salts depends upon several parameters, such as activity at ambient temperatures, possible coloring effects, toxicity, stability in the thermoset product, price, and the like. It should be taken into account that the activity of the metal ion also depends upon the kind of coordinating groups. Because of their good performance at ambient temperature, cobalt-containing accelerators are the most widely used copromoters. However, a disadvantage of cobalt is that cobalt carboxylates are suspect to high toxicity (carcinogenicity). Hence, there is an increasing demand in the thermosetting resin industry for promoters that can provide an appropriate curing without compromising performance of the resulting products.

Much attention has recently been given to thermosetting systems that can be cured via free radical polymerization together with a variety of accelerators. In particular, there is interest in accelerators that are free of any cobalt salts such as cobalt carboxylates. Such cobalt carboxylates are believed to have a high toxicity (carcinogenicity). Various patents describe promoter systems that do not include cobalt salts and that are able to cure thermosetting resins and are described for example in U.S. Pat. No. 8,039,559, WO 2005/047379 A1 and WO 2006/131295 A1, the disclosures of which are incorporated herein by reference in their entirety.

WO 2011/083309 A1 and WO 2011/124282 A1 describe the preparation of accelerators based on iron/manganese complexes of tridentate, tetradentate, pentadentate, or hexadentate nitrogen donor ligands. These publications describe metal iron and manganese metal complexes able to cure unsaturated polyesters and vinyl esters and do not include any cobalt salts. The nitrogen ligands are made from structures which present some difficulty on the preparation of their chemical structures. Multiple steps are required in there preparation which make the products more expensive due to their fabrication problems.

It is also known to use various copper complexes. For example, U.S. Pat. No. 8,722,770 describes curing of unsaturated polyesters and vinyl ester resins using accelerators comprising of copper compounds and acetoacetamide compounds in combination with a potassium carboxylate under the influence of a peroxide. Additionally, an alkaline metal salt such as a potassium carboxylate is also included.

U.S. Pat. No. 8,008,380 discloses complexing agents such as triethanolamine and bipyridine and salts of metal selected from magnesium, lithium, manganese, copper, iron and potassium with optionally a solvent. Additionally, the accelerator solution may include stabilizers such as diethyl acetoacetamide, methyl acetoacetate, trimethyl phosphate, dibutyl phosphate and ethyl acetonate.

U.S. Pat. No. 8,039,559 describes curing of unsaturated polyesters and vinyl ester resins using accelerators that comprise a transition metal compound selected from copper, iron, manganese or titanium and a potassium compound in combination with a 1,3-dioxo compound such as acetyl acetone.

U.S. Publication No. 2013/00338317 relates to a pre-accelerated unsaturated polyester or vinyl ester resin composition comprising a soluble copper compound and a heterocyclic aromatic amine such as imidazole and which resin composition is essentially free of cobalt. The copper and the heterocyclic amines are added in a sufficient amount to accelerate a peroxide curing. Additionally, 1,3-dioxo compounds are also incorporated into the accelerator compositions.

U.S. Pat. Nos. 2,593,787; 2,740,765; 3,437,715 and 3,840,618 describe unsaturated polyester resins containing quaternary ammonium and copper salts which provide extended periods of storage for uncatalized conditions. Upon addition of a polymerization catalyst and high temperatures, short curing times are provided.

U.S. Pat. No. 3,091,936 describes thermosetting resinous compositions capable of rapidly curing using cobalt salts together with N,N-dialkylaryl tertiary amines. The patent also describes stabilization of the resin using copper and quaternary ammonium salts.

There remains the need to have metal complexes that do not include cobalt to cure thermosetting resin systems via free radical polymerization at room temperature or at moderate temperatures, with excellent processability, without compromising their mechanical properties. It also would be desirable to provide a thermosetting resin that has a stable gel time over a specified life time with minimum variation. In addition, it would be advantageous to have an efficient process that would yield products free of toxic or harmful components in the resulting thermosetting materials.

SUMMARY OF THE INVENTION

In the search to alternative and/or improved accelerators for the curing of thermosetting resins in the presence of metal complexes, the inventors have surprisingly found that combinations of copper compounds together with ammonium or phosphonium salts, tertiary amines or phosphines and peroxide initiators provide a solution to one or more of said problems. The accelerators of the present invention for the curing of thermosetting resins comprise a combination of the following components: a) a copper containing complex, b) a quaternary ammonium or phosphonium salt, c) a tertiary amine or phosphine, d) optionally a transition metal salt, and e) a peroxide initiator. Suitable copper containing complexes include copper carboxylates, acetyl acetonates, and bispidon complexes. The optional transition metal salt(s) may include metals such as lithium, calcium, vanadium, zirconium, titanium, nickel, iron, sodium, copper, potassium, magnesium, manganese and barium. The metal salts may be provided as chlorides, bromides, iodites, nitrates, sulfates, phosphates, oxalates, salicylates, alkyl organic acids, other carboxylates, naphtenates, and the like. They may be incorporated alone, in pairs or with one, two or a mixture of the above mentioned metals.

The accelerators of the invention provide thermosetting resin systems with gel times of less than about 60 minutes at temperatures between about 0° C. to about 40° C. and most preferable between temperatures of about 5° C. to about 25° C. As another aspect of the invention, the cobalt-free complexes of the invention provide a thermosetting resin system with a minimum on gel time drift within about 30 to about 90 days or longer.

The cobalt-free complex may be added in several different manners. For example, individual components of, or mixtures of individual components of, the composition may be pre-mixed to form a metal salt complex prior to it being added to the resin composition. Another possibility is to add the individual components of the cobalt-free composition, or particular combinations of individual components of the cobalt-free composition, to the resin and form the metal salt complex in situ. The most preferred method will depend on the specific curing process being carried out.

Other aspects and advantages will be apparent from the following description and the appended claims.

DETAILED DESCRIPTION OF THE INVENTION

The invention is described more fully hereinafter. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, the term "accelerator" or "promoter" includes any and all combinations may indicate the metal complex, metal salts, amines or quaternary ammonium salts. As used herein, the term "co-accelerator" or "co-promoter" includes any and all combinations and may indicate tertiary amines and/or quaternary ammonium salts.

The term "about," as used herein when referring to a measurable value such as but not limited to, for example, a number of carbon atoms, a period of time, a temperature or a number of days and the like, is meant to encompass variations of ±20%, ±10%, ±5%, ±1%, ±0.5%, or even ±0.1% of the specified amount.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the transitional phrase "consisting essentially of" (and grammatical variants) is to be interpreted as encompassing the recited materials or steps "and those that do not materially affect the basic and novel characteristic(s)" of the claimed invention. See, *In re Herz*, 537 F.2d 549, 551-52, 190 U.S.P.Q. 461, 463 (CCPA 1976) (emphasis in the original); see also MPEP § 2111.03. Thus, the term "consisting essentially of" as used herein should not be interpreted as equivalent to "comprising."

In accordance with embodiments of the present invention, provided are improved cobalt-free complexes for the curing of thermosetting resins (i.e., accelerators) which comprise combinations of transition metal salts and peroxide initiators that have surprisingly been found to provide a solution to one or more of said problems. The accelerators of the present invention for the curing of thermosetting resins, comprise a combination of the following components: a) a copper containing complex, b) a quaternary ammonium or phosphonium salt, c) an arylalkyl tertiary amine or phosphine, d) optionally a transition metal salt, and e) a peroxide initiator. The transition metal salt(s) may include metals such as lithium, calcium, vanadium, zirconium, titanium, nickel, iron, sodium, copper, potassium, magnesium, manganese and barium. The metal salts may be contained as chlorides, bromides, iodites, nitrates, sulfates, phosphates, oxalates, salicylates, alkyl organic acids, other carboxylates, naphthenates, and the like. They may be incorporated alone, in pairs or with one, two or a mixture of the above mentioned metals.

"Alkyl" as used herein alone or as part of another group, refers to a straight or branched chain hydrocarbon that can contain from 1, 2, 3, 4, 5, 6 carbon atoms to about 10, 15, 20 or 25 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl, and the like. "Lower alkyl" as used herein, is a subset of alkyl, in some embodiments preferred, and refers to a straight or branched chain hydrocarbon group containing from about 1 to about 4 carbon atoms. Representative examples of lower alkyl include, but are not limited to, methyl, ethyl, n-propyl, iso-propyl, n-butyl, iso-butyl, tert-butyl, and the like. The term "akyl" or "loweralkyl" is intended to include both substituted and unsubstituted alkyl or lower alkyl unless otherwise indicated and these groups may be substituted with groups selected from halo, alkyl, haloalkyl, alkenyl, alkynyl, cycloalkyl, cycloalkylalkyl, aryl, arylalkyl, heterocyclo, heterocycloalkyl, hydroxyl, alkoxy (thereby creating a polyalkoxy such as polyethylene glycol), alkenyloxy, alkynyloxy, haloalkoxy, cycloalkoxy, cycloalkylalkyloxy, aryloxy, arylalkyloxy, heterocyclooxy, heterocyclolalkyloxy, mercapto, alkyl-S(O)$_m$, haloalkyl-S(O)$_m$, alkenyl-S(O)$_m$, alkynyl-S(O)$_m$, cycloalkyl-S(O)$_m$, cycloalkylalkyl-S(O)$_m$, aryl-S(O)$_m$, arylalkyl-S(O)$_m$, heterocyclo-S(O)$_m$, heterocycloalkyl-S(O)$_m$, amino, carboxy, alkylamino, alkenylamino, alkynylamino, haloalkylamino, cycloalkylamino, cycloalkylalkylamino, arylamino, arylalkylamino, heterocycloamino, heterocycloalkylamino, disubstituted-amino, acylamino, acyloxy, ester, amide, sulfonamide, urea, alkoxyacylamino, aminoacyloxy, nitro or cyano where m=0, 1, 2 or 3.

"Alkenyl" as used herein alone or as part of another group, refers to a straight or branched chain hydrocarbon containing from 1, 2, 3, 4, 5, 6 carbon atoms to about 10, 15, 20 carbon atoms (or in lower alkenyl about 1 to about 4 carbon atoms) which include 1 to 4 double bonds in the normal chain. Representative examples of alkenyl include, but are not limited to, vinyl, 2-propenyl, 3-butenyl, 2-butenyl, 4-pentenyl, 3-pentenyl, 2-hexenyl, 3-hexenyl, 2,4-heptadiene, and the like. The term "alkenyl" or "lower alkenyl" is intended to include both substituted and unsubstituted alkenyl or lower alkenyl unless otherwise indicated and these groups may be substituted with groups as described in connection with alkyl and lower alkyl above.

"Alkynyl" as used herein alone or as part of another group, refers to a straight or branched chain hydrocarbon that can contain from 1, 2, 3, 4, 5, 6 carbon atoms to about 10, 15, 20 carbon atoms (or in loweralkynyl 1 to 4 carbon atoms) which include 1 triple bond in the normal chain. Representative examples of alkynyl include, but are not limited to, 2-propynyl, 3-butynyl, 2-butynyl, 4-pentynyl, 3-pentynyl, and the like. The term "alkynyl" or "loweralkynyl" is intended to include both substituted and unsubstituted alkynyl or lower alknynyl unless otherwise indicated and these groups may be substituted with the same groups as set forth in connection with alkyl and lower alkyl above.

"Aryl" as used herein alone or as part of another group, refers to a monocyclic carbocyclic ring system or a bicyclic carbocyclic fused ring system that can have one or more aromatic rings. Representative examples of aryl include, azulenyl, indanyl, indenyl, naphthyl, phenyl, tetrahydronaphthyl, and the like. The term "aryl" is intended to include both substituted and unsubstituted aryl unless otherwise indicated and these groups may be substituted with the same groups as set forth in connection with alkyl and loweralkyl above.

"Arylalkyl" as used herein alone or as part of another group, refers to an aryl group, as defined herein, appended to the parent molecular moiety through an alkyl group, as defined herein. Representative examples of arylalkyl include, but are not limited to, benzyl, 2-phenylethyl, 3-phenylpropyl, 2-naphth-2-ylethyl, and the like.

In another embodiment of the invention, there is provided thermosetting resin systems with gel times of less than about 60 minutes at temperatures between about 0° C. to about 40° C. and most preferable between temperatures of about 5° C. to about 25° C.

Typically, the gel time of thermosetting resins may drift after one day to several weeks or months. It is also desirable that that the vinyl-containing thermosetting resins maintain a stable gel time over a specified life time with minimum variation. As another aspect of the invention, there is provided a resin system with minimum drift on gel time within about 30 to about 90 days or longer.

In an embodiment, the copper containing complexes of the invention may be from reactions of copper with alkyl organic acids, carboxylates and naphthenates prepared according to U.S. Pat. No. 5,859,267.

In one embodiment, the copper containing complex is:

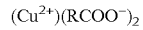

wherein R can be H, substituted or unsubstituted linear alkyl, substituted or unsubstituted branched alkyl, substituted or unsubstituted linear alkenyl, substituted or unsubstituted branched alkenyl, substituted or unsubstituted linear alkynyl, substituted or unsubstituted branched alkynyl, substituted or unsubstituted aryl, or substituted or unsubstituted alkylaryl.

In another embodiment, the copper containing complex can be a naphthenate. Naphthenates can be a mixture of various cyclopentyl and cyclohexyl carboxylic acids, or cycloaliphatic carboxylic acids, of molecular weight from about 120 daltons to well over about 700 daltons. Generally, most naphthenic acids have a carbon backbone with about 9 to about 20 carbons. In some embodiments, the naphthenic acids have a carbon backbone of about 10 to about 16 carbons. In some embodiments, naphthenates can be, for example:

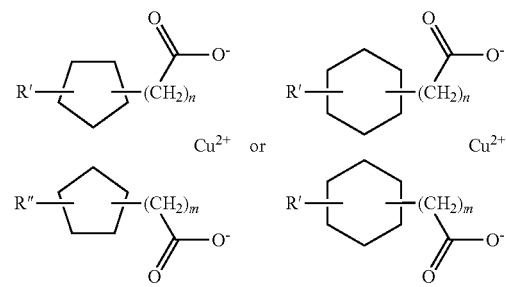

wherein m and n can be independently an integer of 0 or greater, for example, 0, 1, 2, 3, 4, 5, 6, 10, 15, 20 or greater, and R' and R" can be independently H, substituted or unsubstituted linear alkyl, substituted or unsubstituted branched alkyl, substituted or unsubstituted linear alkenyl, substituted or unsubstituted branched alkenyl, substituted or unsubstituted linear alkynyl, substituted or unsubstituted branched alkynyl, substituted or unsubstituted aryl, or substituted or unsubstituted alkylaryl.

Alternatively, in yet another embodiment, the copper containing complex may be provided as complexes of acetyl acetonates as those described in U.S. Pat. No. 4,138,385, for example:

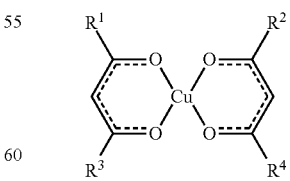

wherein $R^1$, $R^2$, $R^3$ and $R^4$ each independently can be H, substituted or unsubstituted linear alkyl, substituted or unsubstituted branched alkyl, substituted or unsubstituted linear alkenyl, substituted or unsubstituted branched alkenyl, substituted or unsubstituted linear alkynyl, substituted or unsubstituted branched alkynyl, substituted or unsubstituted aryl, or substituted or unsubstituted alkylaryl.

In still another embodiment, the copper containing complex may be provided as complexes of bispidon, for example:

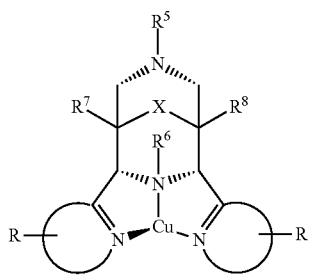

wherein $R^5$ and $R^6$ are each independently: a group containing a heteroatom capable of coordinating to a transition metal; a $C_1$-$C_{22}$ substituted or unsubstituted alkyl; a $C_6$-$C_{10}$ aryl, wherein at least one of $R^5$ and $R^6$ is a non-aromatic hydrocarbon group, the non-aromatic hydrocarbon group being a $C_8$-$C_{22}$ alkyl chain, $R^7$ and $R^8$ are independently: H; $C_1$-$C_4$ alkyl; phenyl; electron withdrawing groups; and reduced products and derivatives thereof, X is selected from: C=O; a ketal derivative of C=O; a thioketal derivative of C=O; and —[C($R^7$)$_2$]$_y$—, wherein y is 0 or 1 and $R^7$ are each independently selected from H, OH, O—$C_1$-$C_{24}$ alkyl, O-benzyl, O—(C=O)—$C_1$-$C_{24}$ alkyl and $C_1$-$C_{24}$ alkyl, and wherein R are each independently $C_1$-$C_4$ alkyl, for example, such as those described in patent publications WO 2005/042532; WO 2011/083309; and WO2011/124282, the disclosures of which are incorporated herein by reference in their entirety.

The copper containing complexes may also include copper salts contained as chlorides, bromides, iodites, nitrates, sulfates, phosphates, oxalates, salicylates, and the like. They may be incorporated alone, in pairs or with one, two or a mixture of the above mentioned metals.

Preferably the copper containing complex added to the resin may be in the range from 0.0001 to about 3.0 percent based on the resin weight. Most preferably, the amount of copper containing complex added to the resin may be in the range from 0.0005 to about 0.5 weight percent based on the resin weight. The level of copper containing complex added to resin and optionally a transition metal salt essentially free of cobalt may depend on the ultimate gel time and curing desired of the thermosetting resin. The copper containing complex also includes an ammonium or phosphonium salt and a tertiary amine or phosphine used as co-promoters to cure the resin systems. Ammonium salts may for examples include, but are not limited to, tetramethylammonium chloride tetramethylammonium hydroxide, tetramethylammonium bromide, tetramethylammonium hydrogensulfate, benzyltrimethylammonium chloride, benzyltrimethylammonium bromide, benzyltrimethylammonium hydrogen sulfate, benzyltributylammonium chloride, benzyltributylammonium bromide, benzyltributylammonium hydrogen sulfate, other examples of quaternary ammonium salts are described in U.S. Pat. Nos. 2,593,797; 2,740,765; 3,437,715 and 3,840,618, the disclosures of which are incorporated herein by reference in their entirety. Mixtures of the above may also be employed.

Phosphonium containing compounds of the present invention may also be used as part of the promotion system to cure thermosetting resins. Examples include, but are not limited to, triphenyl phosphine, tributyl phosphine, tributylphosphonium acetate, tributylphosphonium bromide, tributylphosphonium chloride, tributylphosphonium fluoride, tributylphosphonium iodide, tetraphenylphosphonium chloride, tetraphenylphosphonium bromide, tetraphenylphosphonium acetate, and phosphine salts as those described in U.S. Pat. No. 4,310,708, and U.S. patent application Ser. No. 14/229,517 the disclosures of which are incorporated herein by reference in its entirety.

Several tertiary amines, often alkylaryl amines may be used in combination with the metal salts such as N,N-dimethyl aniline, N,N-diethyl aniline, N,N-dimethyl acetoacetamide, N,N-dimethyl p-toluidine, trithylamine, triethanolamine, and tertiary aromatic amines. Other tertiary fatty amines may also be incorporated such as ethoxylated amines derived from coco, soya, tallow or stearyl amines. Other accelators that can also be added include but are not limited to 1,3-diketones such as acetylacetone, benzoylacetone, and the like. Examples of the variety of mercapto compounds which can be used in this invention are as follows: mercaptobenzothiazole (MBT), n-dodecylmercaptan, n-octadecylmercaptan, d-limonene dimercaptan, methyl-3-mercaptopropionate, 2-mercapto ethyl palmitate, dibutyl mercaptosuccinate, ferrous mercaptobenzothiazolate, and cupric mercaptobenzothiazolate and the like. Thioureas may also be incorporated into the composition such 1,3-Di-o-tolyl-2-thiourea, 1,3-Di-p-tolyl-2-thiourea, 1,3-Di-tert-butyl-2-thiourea, 1,3-Diallyl-2-thiourea, 1,3-Dibenzyl-2-thiourea, 1-(3-Pyridyl)-2-thiourea, 1-butyl-2-thiourea, 1-butyl-3-phenyl-2-thiourea, acetylthiourea, tetramethylthiourea, thiourea, N-ethylthiourea, N,N'-dibutylthiourea, N,N'-diethylthiourea, N,N'-dimethylthiourea, N,N'-diphenylthiourea, N,N'-diphenylthiourea, N-phenylthiourea. Examples of thioureas are described for example in U.S. Pat. Nos. 3,338,876; 3,970,505; 4,569,976; 7,173,074; 7,498,367; the disclosures of which are incorporated herein by reference in their entirety. Mixtures of the above may be used.

In accordance with embodiments of the present invention, the unsaturated polyesters are prepared by the condensation of polycarboxylic acid or anhydrides with polyhydric alcohols under a nitrogen atmosphere. Anhydrides that can be employed in the making are preferably cyclic or acyclic, saturated or unsaturated. In a "cyclic" anhydride, the anhydride functionality is contained within a ring, such as in phthalic anhydride and maleic anhydride. "Saturated" anhydrides contain no ethylenic unsaturation, although they may contain aromatic rings. Phthalic anhydride and succinic anhydride are examples of saturated anhydrides. "Unsaturated" anhydrides contain ethylenic unsaturation. This unsaturation typically becomes incorporated into the hydroxyl containing intermediates, and form part of the crosslinking of the thermosetting resin. Examples include maleic anhydride, itaconic anhydride, and the like.

Specific examples of suitable anhydrides include, but are not limited to, propionic anhydride, maleic anhydride, phthalic anhydride, tetrabromophthalic anhydride, succinic anhydride, tetrahydrophthalic anhydride, citraconic anhydride, itaconic anhydride, and aryl-, alkyl-, and halogen-substituted derivatives of the above. Mixtures of these anhydrides may be used. Monocarboxylic acid such as benzoic acid, cyclohexane monocarboxylic acid, crotonic acid and the like may optionally be included. The selection of the amounts of monocarboxylic acid and anhydride that may be used can be determined by the end user, and may depend, for example, upon the types of physical properties or degree of crosslinking that is desired.

Specific examples of dicarboxylic acids include but are not limited to, fumaric acid, isphthalic acid, terephthalic acid, adipic acid, cyclohexane dicarboxylic acid, succinic acid, adipic acid, sebacic acid, azealic acid, malonic acid, alkenyl succinic acids such as n-dodecenylsuccinic acid, docecylsuccinic acid, octadecenylsuccinic acid, and anhydrides thereof. Lower alkyl esters of any of the above may also be employed. Mixtures of any of the above are suitable.

Additionally, polybasic acids or anhydrides thereof, having not less than three carboxylic acid groups may be employed. Such compounds include 1,2,4-benzenetricarboxylic acid, 1,3,5-benzene tricarboxylic acid, 1,2,4-cyclohexane tricarboxylic acid, 2,5,7-naphthalene tricarboxylic acid, 1,2,4-naphthalene tricarboxylic acid, 1,3,4-butane tricarboxylic acid, 1,2,5-hexane tricarboxylic acid, 1,3-dicarboxyl-2-methyl-2-carboxymethylpropane, tetra(carboxymethyl)methane, 1,2,7,8-octane tetracarboxylic acid, and mixtures thereof.

In accordance with embodiments of the present invention, a wide range of polyhydric alcohols may be used in the method of the invention, the selection of which can be determined by one skilled in the art. It is preferred that these alcohols have sufficiently high boiling points such that themselves and their corresponding esters formed therefrom are not volatilized and lost under the reaction condition. The alcohols may include, but are not limited to, ethylene glycol, diethylene glycol, neopentyl glycol, dibromoneopentyldiol, 2-methyl-1,3-propanediol, 2,2,4-trimethyl-1,3pentadiol, 2-butyl-2ethyl-1,3-propanediol, polyethoxylated bisphenol "A", polypropoxylated bisphenol "A", 1,4-cyclohexane dimethanol, trimethylol propane diallylether, propylene glycol, dipropylene glycol, 1,3-butanediol, 1,4-butanediol, 1,3 hexanediol, 1,3-butylene glycol, 1,6-hexanediol, hydrogenated bisphenol "A", 1,4-cyclohexanol, ethylene oxide adducts of bisphenols, propylene oxide adducts of bisphenols, sorbitol, 1,2,3,6-hexatetrol, 1,4-sorbitan, pentaerythritol, dipentaerythritol, tripentaerythritol, sucrose, 1,2,4-butanetriol, 1,2,5-pentanetriol, glycerol, 2-methyl-propanetriol, 2-methyl-1,2,4-butanetriol, trimethylol ethane, trimethylol propane, and 1,3,5-trihydroxyethyl benzene. Halogen or phosphorus containing intermediates of the above may also be employed. Mixtures of the above alcohols may be used.

Optionally, monofunctional alcohols may be included as an option to modify the crosslinking density on the thermosetting resin. The monoalcohols include but are not limited to, n-butanol, n-hexanol, octanol, undecanol, dodecanol, cyclohexylmethanol, benzyl alcohol, phenoxy ethanol, alky and aryl monoalcohols and the like.

In accordance with embodiments of the present invention, dicyclopentadiene (DCPD) resins used in this invention are known to those skilled in the art. These resins are typically DCPD polyester resins and derivatives which may be made according to various accepted procedures. As an example, these resins may be made by reacting DCPD, ethylenically unsaturated dicarboxylic acids, and compounds having two groups wherein each contains a reactive hydrogen atom that is reactive with carboxylic acid groups. DCPD resins made from DCPD, maleic anhydride phthalic anhydride, isophthalic acid, terephthalic acid, adipic acid, water, and a glycol such as, but not limited to, ethylene glycol, propylene glycol, diethylene glycol, neopentyl glycol, dipropylene glycol, and poly-tetramethylene glycol, are particularly preferred for the purposes of the invention. The DCPD resin may also include nadic acid ester segments that may be prepared in-situ from the reaction of pentadiene and maleic anhydride or added in its anhydride form during the preparation of the polyester. Examples on the preparation of DCPD unsaturated polyester resins can be found in U.S. Pat. Nos. 3,883,612 and 3,986,922, the disclosures of which are incorporated herein by reference in their entirety.

According to some embodiments of the present invention, various amounts of the weight equivalent ratio of polycarboxylic acid or anhydride to polyhydric alcohols may be employed. Preferably, the weight equivalent ratio of polycarboxylic acid or anhydride to polyhydric alcohols ranges from about 1:1 to about 1:10, and more preferably from about 1:1.5 to about 1:2.5.

Polymerization inhibitors may also be included in the polymerization mixture such as phenothiazine, phenol, 2,6-di-tert-butyl-4-methyl phenol, hydroquinone (HQ), tolu-hydroquinone (THQ), bisphenol "A" (BPA), triphenyl antimony, naphthoquinone (NQ), p-benzoquinone (p-BQ), butylated hydroxy toluene (BHT), hydroquinone monomethyl ether (HQMME), 4-ethoxyphenol, 4-propoxyphenol, and propyl isomers thereof, monotertiary butyl hydroquinone (MTBHQ), ditertiary Butyl hydroquinone (DTBHQ), tertiary butyl catechol (TBC), 1,2-dihydroxybenzene, 2,5-dichlorohydroquinone, 2-acetylhydroquinone, 1,4-dimercaptobenzene, 2,3,5-trimethylhydroquinone, 2-aminophenol, 2-N,N,-dimethylaminophenol, catechol, 2,3-dihydroxyacetophenone, pyrogallol, 2-methylthiophenol or other substituted and un-substituted phenols, and mixtures of the above.

Other polymerization inhibitors may include stable hindered nitroxyl compounds such as N,N-di-tert-butylnitroxide; N,N-di-tert-amylnitroxide; N-tert-butyl-2-methyl-1-phenyl-propylnitroxide; N-tert-butyl-1-diethyl phosphono-2,2-dimethyl propyl nitroxide; 2,2,6,6-tetramethyl-piperidinyloxy; 4-amino-2,2,6,6-tetramethyl-piperidinyloxy; 4-hydroxy-2,2,6,6-tetramethyl-piperidinyloxy; 4-oxo-2,2,6,6-tetramethyl-piperidinyloxy; 4-dimethylamino-2,2,6,6-tetramethyl-piperidinyloxy; 4-ethanoyloxy-2,2,6,6-tetramethyl-piperidinyloxy; 2,2,5,5-tetramethylpyrrolidinyloxy; 3-amino-2,2,5,5-tetramethyl-pyrrolidinyloxy; 2,2,4,4-tetramethyl-1-oxa-3-azacyclopentyl-3-oxy; 2,2,4,4-tetramethyl-1-oxa-3-pyrrolinyl-1-oxy-3-carboxylic acid; 2,2,3,3,5,5,6,6-octamethyl-1,4-diazacyclohexyl-1,4-dioxy; 4-bromo-2,2,6,6-tetramethyl-piperidinyloxy; 4-chloro-2,2,6,6-tetramethyl-piperidinyloxy; 4-iodo-2,2,6,6-tetramethyl-piperidinyloxy; 4-fluoro-2,2,6,6-tetramethyl-piperidinyloxy; 4-cyano-2,2,6,6-tetramethyl-piperidinyloxy; 4-carboxy-2,2,6,6-tetramethyl-piperidinyloxy; 4-carbomethoxy-2,2,6,6-tetramethyl-1-piperidinyloxy; 4-carbethoxy-2,2,6,6-tetramethyl-piperidinyloxy; 4-cyano-4-hydroxy-2,2,6,6-tetramethyl-piperidinyloxy; 4-methyl-2,2,6,6-tetramethyl-1-piperidinyloxy; 4-carbethoxy-4-hydroxy-2,2,6,6-tetramethyl-piperidinyloxy; 4-hydroxy-4-(1-hydroxypropyl)-2,2,6,6-tetramethyl-piperidinyloxy; 4-methyl-2,2,6,6-tetramethyl-1,2,5,6-tetrahydropyridinyloxyl, and the like. Additional useful stable hindered nitroxyl inhibitors are described on patent publications WO 01/40404 A1, WO 01/40149 A2, WO 01/42313 A1, U.S. Pat. Nos. 4,141,883; 6,200,460 B1; and 5,728,872, the disclosures of which are incorporated herein by reference in their entirety.

According to some embodiments of the present invention, various amounts of inhibitors may be employed. Preferably, the inhibitors ranges from about 0.0001 to about 0.5 percent based on the weight of the reactants, and more preferably from about 0.001 to about 0.1 percent by weight. They may be added alone or as mixtures.

According to some embodiments, vinyl ester resins of the present invention are prepared by the reaction between the vinyl containing organic acid such as methacrylic acid and an epoxide containing intermediate in the presence of a catalyst. Any number of epoxide(s) can be used for the purpose of the invention. Preferably the polyepoxide(s) include but are not limited to glycidyl methacrylate, glycidyl polyethers of both polyhydric alcohols and polyhydric phenols, bisphenol A epoxy, bisphenol F epoxy, glycidyl ester of neodecanoic acid, flame retardant epoxy resins based on tetrabromo bisphenol A, epoxy novolacs, epoxidized fatty acids or drying oil acids, epoxidized diolefins, epoxidized unsaturated acid esters as well as epoxidized unsaturated polyesters. Mixtures of the above may be employed. The polyepoxides may be monomeric or polymeric. Particularly preferred polyepoxides are glycidyl ethers of polyhydric alcohols or polyhydric phenols having equivalent weights per epoxide groups ranging from about 150 to about 1500, more preferably from about 150 to about 1000.

The epoxy component can be used in varying amounts according to some embodiments of the present invention. As an example, an epoxide may be reacted with an acid in a proportion of about 1 equivalent of epoxide per each equivalent of acid. The epoxy may be used ranging from about 30 to about 55 percent based on the weight of the reactants. Preferably, the epoxy intermediate is used in an amount ranging from about 20 to about 40 percent by weight.

In the reaction of the epoxy and the vinyl unsaturated acid, a catalyst is used to catalyze the reaction. A number of catalysts may be employed for this purpose. Exemplary catalysts include, but are not limited to, organophosphonium salts, and tertiary amines such as 2,4,6-tri(dimethylaminomethyl)phenol [DMP-30] and the like. Tertiary amines and quaternary ammonium salts may be used. Examples include, but are not limited to, tetramethylammonium chloride tetramethylammonium hydroxide, tetramethylammonium bromide, tetramethylammonium hydrogensulfate, benzyltrimethylammonium chloride, benzyltrimethylammonium bromide, benzyltrimethylammonium hydrogen sulfate, benzyltributylammonium chloride, benzyltributylammonium bromide, benzyltributylammonium hydrogen sulfate, 1,4-diazabicyclo[2.2.2]octane, diazabicyclo[4.3.0]-nonene-(5), 2-methyl imidazol, piperidine, morpholine, triethyl amine, tributyl amine, and the like. Mixtures of the above may also be employed.

Phosphorous containing compounds may also be used as a catalyst involving the epoxide. Examples include, but are not limited to, triphenyl phosphine, tributyl phosphine, tributylphosphonium acetate, tributylphosphonium bromide, tributylphosphonium chloride, tributylphosphonium fluoride, tributylphosphonium iodide, tetraphenylphosphonium chloride, tetraphenylphosphonium bromide, tetraphenylphosphonium acetate, and phosphine salts as those described in U.S. Pat. No. 4,310,708, the disclosure of which is incorporated herein by reference in its entirety.

The reaction involving the epoxide is preferably carried out at a temperature ranging from about 50° C. to about 120° C., and more preferably from about 80° C. to about 110° C.

Urethane (meth)acrylates are also useful in the present invention for the preparation of cured thermosetting products. The compounds are typically the reaction products of polyols in which the hydroxyl groups are first reacted with a diisocyanate using one equivalent of diisocyanate per hydroxyl group, and the free isocyanate groups are the reacted with a hydroxyalkyl ester of acrylic or methacrylic acid. The polyhydric alcohol suitable for preparing the urethane poly(acrylate) typically contains at least two carbon atoms and may contain from 2 to 4, inclusive, hydroxyl groups. Polyols based on the polycaprolactone ester of a polyhydric alcohol such as described in, for example, U.S. Pat. No. 3,169,945, are included. Unsaturated polyols may also be used such as those described in U.S. Pat. Nos. 3,929,929 and 4,182,830, the disclosures of which are incorporated herein by reference in their entirety.

Diisocyanates suitable for preparing the urethane poly (acrylate) are well known in the art and include aromatic, aliphatic, and cycloaliphatic diisocyanates. Such isocyanates may be extended with small amounts of glycols to lower their melting point and provide a liquid isocyanate. The hydroxyalkyl esters suitable for final reaction with the polyisocyanate formed from the polyol and diisocyanate are exemplified by hydroxylacrylate, hydroxypropyl acrylate, hydroxyethyl methacrylate, and hydroxypropyl methacrylate.

Other components may be employed in accordance with the present invention. Examples of components include, but are not limited to, polymerization inhibitors, free radical scavengers, and antioxidants. The thermosetting resins of the invention may be used in combination with other thermosetting resins such as polyesters, vinyl esters, polyurethane (meth)acrylates and suitable monomeric components to form a liquid resin. The liquid resin may be employed, for example, as a laminating resin, molding resin, or a gel coat resin as a coating on a suitable substrate. A number of substrates may be employed such as, for example, a marine vessel, a vehicle, or an aircraft.

A vinyl monomer may also be included as a diluent with the unsaturated polyester, vinyl ester and polyurethane (meth)acrylate. Suitable monomers may include those such as, for example, styrene and styrene derivatives such as alpha-methyl styrene, p-methyl styrene, divinyl benzene, divinyl toluene, ethyl styrene, vinyl toluene, tert-butyl styrene, monochloro styrene, dichlorostyrene, trichlorostyrene, bromostyrene, dibromostyrene, tribromostyrene, fluorostyrene, difluorostyrene, trifluorostyrene, tetrafluorostyrene and pentafluorostyrene, halogenated alkylstyrenes such as chloromethylstyrene, alkoxystyrenes such as paramethoxy styrene. Monounsaturated compounds maybe used alone or in combination.

Other monomers which may be used include allylic compounds containing more than one allyl group per molecule. For example, diallyl phthalate, diallyl itaconate, diallyl maleate, triallylmellitate, triallylmesate, triallylisocyanurate, triallycyanurate, and partial polymerization products prepared therefrom.

Other unsaturated compounds also include (meth)acrylates and acrylamides. For example, methyl (meth)acrylate, ethyl (meth)acrylate, propyl (meth)acrylate, hexyl (meth) acrylate, octyl (meth)acrylate, cyclohexananol (meth)acrylate, phenoxyethyl (meth)acrylate, hydroxyethyl (meth) acrylate, hydroxypropyl (meth)acrylate, and mixtures thereof.

Any suitable polyfunctional acrylate may be used in the resin composition. Such compounds include ethylene glycol di(meth)acrylate, butanediol di(meth)acrylate, hexanediol di(meth)acrylate, ethoxylated trimethylolpropane tri(meth) acrylate, trimethylolmethane tetra(meth)acrylate, pentaerythritol tetra(meth)acrylate, dipentaerythritol tetra(meth) acrylate, dipentaerythritol penta(meth)acrylate, dipentaerythritol hexa(meth)acrylate, ethoxylated polyhydric phenol di(meth)acrylates containing from 1 to 30 ethylene oxide units per OH group in the phenol, propoxylated polyhyric phenol di(meth)crylates and di(meth)acrylates containing from 1 to 30 propylene oxide groups per OH groups in the phenol. Examples of some useful di- and polyhydric phenols include catechol; resorcinol; hydroquinone; 4,4'-biphenol; 4,4'-ispropylidenebis(o-cresol); 4,4'-isopropylidenebis(2-phenyl phenol); alkylidenediphenols such as bisphenol "A"; pyrogallol; phloroglucinol; naphthalene diols; phenol; formaldehyde resins; resorcinol/formaldehyde resins; and phenol/resorcinol/formaldehyde resins. Halogen or phosphorus containing intermediates of the above may also be employed. Mixtures of the above mono-, di- and poly(meth)acrylates may also be employed.

The liquid thermosetting resin systems and/or their mixtures may include an initiator to aid in the curing (cross-linking) of the resin. A number of initiators may be employed, such as, for example, an organic peroxide. Exemplary organic peroxides that may be used include, for example, cumene hydroperoxide; methyl ethyl ketone peroxide; benzoyl peroxide; 2,4-pentanedione peroxide; 2,5-dimethylhexane-2,5-dihydroperoxide; tert-butyl peroxybenzoate; di-tert-butyl perphthalate; dicumyl peroxide; 2,5-dimethyl-2,5-bix(tert-butylperoxide)hexane; 2,5-dimethyl-2,5-bis(tert-butylperoxy)hexyne; bis(tert-butylperoxyisopropyl)benzene; ditert-butyl peroxide; 1,1-di(tert-amylperoxy)-cyclohexane; 1,1-di-(tert-butylperoxy)-3,3,5-trimethylcyclohexane; 1,1-di-(tert-butylperoxy)-cyclohexane; 2,2-di-(tert-butylperoxy)butane; n-butyl-4,4-di(tert-butylperoxy)valerate; ethyl-3,3-di-(tert-amylperoxy) butyrate; ethyl-3,3-di(tert-butylperoxy)-butyrate; t-butyl peroxy-neodecanoate; di-(4-5-butyl-cyclohexyl)-peroxy-dicarbonate; lauryl peroxide; 2,5-dimethyl-2,5-bis(2-ethyl-hexanoyl peroxy) hexane; t-amyl peroxy-2-ethylhexanoate; 2,2'-azobis(2-methylpropionitrile); 2,2'-azobis(2,4-methylbutanenitrile); and the like. Mixtures of any of the above may be used. The agent is preferably employed in an amount from about 0.2 to 3.0 percent based on the weight of the thickened resin, more preferably from about 0.5 to 1.5 percent by weight, and most preferably from about 0.5 to 1.25 percent by weight.

The accelerators of the present invention for the curing of thermosetting resins, comprise a combination of the following components: a) an copper containing complex, b) an ammonium or phosphonium salt, c) an arylalkyl tertiary amine or phosphine, dd) optionally a transition metal salt, and e) a peroxide initiator. The metal salts may be contained as chlorides, bromides, iodides, nitrates, sulfates, phosphates, oxalates, salicylates, alkyl organic acids, other carboxylates, naphthenates, and the like. They may be incorporated alone, in pairs or with one, two or a mixture of the above mentioned metals. This means e.g. one kind of transition metal but different coordination ions or ligands; different transition metal ions and one kind of coordinating ions or ligands; and combinations of these. The accelerator may be added in several different manners. For example, individual components of, or mixtures of some or all of the individual components of, the accelerator may be pre-mixed to form a metal salt complex prior to it being added to the resin composition. Another possibility is to add the individual components of the accelerator composition, or particular combinations of individual components of the accelerator composition, to the resin and form the metal complex in situ. Yet another possibility is to add one or more individual components of the accelerator composition to the thermosetting resin before use, in which one or more of the individual components of the accelerator composition are already present. In some embodiments, the individual component of the accelerator added to the thermosetting resin before use and to initiate curing is the peroxide initiator, and the remaining components of the accelerator are already present in the thermosetting resin. The most preferred method will depend on the specific curing process being carried out. Examples of the metal salts are described for example in patent publications WO 90/12824 A1, WO 03/093384 A1, and U.S. Pat. No. 8,039,559 B2; the disclosures of which are incorporated herein by reference in their entirety.

Flame retardant compounds may also be included in the present invention such as those described in numerous publications and patents known to those skilled in the art. Useful in formulating flame retardant compositions are, for example, brominated flame retardants compounds. Preferred brominated flame retardant compounds include, for example, 1,3,5-tris(2,4,6-tribromophenoxy)triazine, brominated polystyrene, brominated cyclodecane, brominated bisphenol-A diglycidyl ether, alkyl or aryl or mixed aromatic-aliphatic phosphate esters such as Triphenyl, tricresyl phosphate, diphenyl-(2-ethyl hexyl)phosphate, tris(2-chloroisopropyl)phosphate, trithylphosphate, tri-n-butyl phosphate, tri-isobutyl phosphate, di-n-butyl phosphate, tris(allyphenylphosphate), tris(2-methoxy-4-allylphosphate), tris (2-propylphenyl)phosphate, tri(4-vinylphenyl)phosphate, bis(diphenylphosphate ester)s of bisphenols such as bisphenol-A, resorcinol or hydroquinone, resorcinol bis(2,6-dixylenyl phosphate), bis(diphenylphosphoramide)s, phosphonates such as dimethymethyl phosphonate, dimethylpropyl phosphonate, phosphites such as dimethyl phosphite, diethyl phosphite, trimethyl phosphite, triethyl phosphite, melamine polyphosphate, melamine cyanurate, metal phosphites, inorganic metal phosphites, red phosphorus, ammonium polyphosphate, and the like and mixtures thereof.

Addition of fiber(s) provides a means for strengthening or stiffening the polymerized cured composition forming the substrate. The types often used are: Inorganic crystals or polymers, e.g., glass fiber, quartz fibers, silica fibers, fibrous ceramics, e.g., alumina-silica (refractory ceramic fibers); boron fibers, silicon carbide, silicon carbide whiskers or monofilament, metal oxide fibers, including alumina-boric-silica, alumina-chromia-silica, zirconia-silica, and others.

Organic polymer fibers, e.g., fibrous carbon, fibrous graphite, acetates, acrylics (including acrylonitrile), aliphatic polyamides (e.g. nylon), aromatic polyamides, olefins (e.g., polypropylenes, polyesters, ultrahigh molecular weight polyethylenes), polyurethanes (e.g., Spandex), alpha-cellulose, cellulose, regenerated cellulose (e.g., rayon), jutes, sisal, vinyl chlorides, vinylidenes, flax, and thermoplastic fibers; metal fibers, e.g., aluminum, boron, bronze, chromium, nickel, stainless steel, titanium or their alloys; and "whiskers", single, inorganic crystals.

Suitable filler(s) non-fibrous are inert, particulate additives being essentially a means of reducing the cost of the final product while often reducing some of the physical properties of the polymerized cured compound. Fillers used in the invention include calcium carbonate of various form and origins, silica of various forms and origins, silicates, silicon dioxides of various forms and origins, clays of various forms and origins, feldspar, kaolin, flax, zirconia, calcium sulfates, micas, talcs, wood in various forms, glass (milled, platelets, spheres, micro-balloons), plastics (milled, platelets, spheres, micro-balloons), recycled polymer composite particles, metals in various forms, metallic oxides or hydroxides (except those that alter shelf life or viscosity), metal hydrides or metal hydrates, carbon particles or granules, alumina, alumina powder, aramid, bronze, carbon black, carbon fiber, cellulose, alpha cellulose, coal (powder), cotton, fibrous glass, graphite, jute, molybdenum, nylon, orlon, rayon, silica amorphous, sisal fibers, fluorocarbons and wood flour.

Other reinforcements know to one skilled in the art may include inorganic and organic woven or non-woven fabrics such as glass, quartz, and the like. Reinforcement may be in the form of glass roving cloth, glass cloth, chopped glass, hollow glass fibers, glass mat, glass surfacing mat, and non-woven glass fabric, ceramic fiber fabrics, and metallic fiber fabrics. Organic fabrics include aramid, carbon fiber, cellulose, alpha cellulose, cotton, fibrous jute, nylon, orlon, rayon, sisal fibers, fluorocarbon, aromatic polyamides, olefins (e.g., polypropylenes, polyesters, ultrahigh molecular weight polyethylenes), polyurethanes (e.g., Spandex), alpha-cellulose, cellulose, regenerated cellulose and mixtures thereof.

Additional additives known by the skilled artisan may be employed in the laminating resin composition of the present invention including, for example, thixotropic agents, paraffin waxes, fatty acids, fatty acid derivatives, lubricants, and shrink-reducing additives. Various percentages of these additives can be used in the laminating resin composition.

Thermoplastic polymeric materials which reduce shrinkage during molding can also be included in the composition of the invention. These thermoplastic materials can be used to produce molded articles having surfaces of improve smoothness. The thermoplastic resin is added into the unsaturated polyester composition according to the invention in order to suppress shrinkage at the time of curing. The thermoplastic resin is provided in a liquid form and is prepared in such a manner that 30 to 45% by weight of the thermoplastic resin is dissolved in 55 to 70% by weight of polymerizable monomer having some polymerizable double bond in one molecule. Examples of the thermoplastic resin may include styrene-base polymers, polyethylene, polyvinyl acetate base polymer, polyvinyl chloride polymers, polyethyl methacrylate, polymethyl methacrylate or copolymers, ABS copolymers, Hydrogenated ABS, polycaprolactone, polyurethanes, butadiene styrene copolymer, and saturated polyester resins. Additional examples of thermoplastics are copolymers of: vinyl chloride and vinyl acetate; vinyl acetate and acrylic acid or methacrylic acid; styrene and acrylonitrile; styrene acrylic acid and allyl acrylates or methacrylates; methyl methacrylate and alkyl ester of acrylic acid; methyl methacrylate and styrene; methyl methacrylate and acrylamide. In the resin composition according to the invention, 5 to 50% by weight of the liquid thermoplastic resin is mixed; preferably 10 to 30% by weight of the liquid thermoplastic resin is mixed.

Low profile agents (LPA) are composed primarily of thermoplastic polymeric materials. These thermoplastic intermediates present some problems remaining compatible with almost all types of thermosetting resin systems. The incompatibility between the polymeric materials introduces processing difficulties due to the poor homogeneity between the resins. Problems encountered due to phase separation in the resin mixture include, scumming, poor color uniformity, low surface smoothness and low gloss. It is therefore important to incorporate components that will help on stabilizing the resin mixture to obtain homogeneous systems that will not separate after their preparation. For this purpose, a variety of stabilizers can be used in the present invention which includes block copolymers from polystyrene-polyethylene oxide as those described in U.S. Pat. Nos. 3,836,600 and 3,947,422. Block copolymer stabilizers made from styrene and a half ester of maleic anhydride containing polyethylene oxide as described in U.S. Pat. No. 3,947,422. Also useful stabilizers are saturated polyesters prepared from hexanediol, adipic acid and polyethylene oxide available from BYK Chemie under code number W-972.

Additional additives include phenolic type antioxidants as those described in pages 1 to 104 in "Plastic additives", by R. Gächter and Müller, Hanser Publishers, 1990. Also included are Mannich type antioxidants, specially phenols and naphthols, suitable for the purpose herein include hindered aromatic alcohols, such as hindered phenols and naphthols, for example, those described in U.S. Pat. No. 4,324,717, the disclosure of which is incorporated herein by reference in its entirety.

Additional additives known by the skilled artisan may be employed in the resin composition of the present invention including, for example, pigments, dyes, paraffins, lubricants, flow agents, air release agents, wetting agents, UV stabilizers, and shrink-reducing additives. Various percentages of these additives can be used in the resin compositions.

Internal release agents are preferably added to the molding composition according to the invention. Aliphatic metal salts such as zinc stearate, magnesium stearate, calcium stearate or aluminum stearate can be used as the internal release agent. The amount of internal release agent added is in the range of 0.05 to 5.0% by weight, more preferably in the range of from 0.4% to 4.0% by weight. Hence, stable release can be made at the time of demolding without occurrence of any crack on the molded product.

In some embodiments of the present invention, composite articles may be formed by applying a curable thermosetting composition to a substrate or a reinforcing material, such as by impregnating or coating the substrate or reinforcing material, and curing the curable composition. The properties accomplished from these materials can provide composite systems that can be used in various applications which can include molding, lamination, infusion, pultrusion, encapsulation, coatings, adhesives, prepregs, electrical and electronic components.

The following examples are provided to illustrate the present invention, and should not be construed as limiting thereof.

EXAMPLES

Nomenclature:
BrTTPPCu—Tetraphenyl phosphine copper bromide.
Cu NAP—8% copper Naphthenate.
DMPT—Dimethyl p-toluidine.
QUAT—Alkyl dimethyl benzyl ammonium chloride.
ATUR—Allyl Thiourea.
DMAA—Dimethyl acetoacetamide.
BORCHI WXP-126—Iron complex available from OMG.
CHP—Cumene Hydroperoxide—Norox CHP.
MEKP—Methyl ethyl ketone peroxide—Norox 935.
DION® 490-00—high reactivity terephthalic acid-propylene glycol unsaturated polyester.
DION® 495-00—high reactivity terephthalic acid-propylene glycol unsaturated polyester.
POLYLITE® 31051-00—DCPD type unsaturated polyester.
DION® 9102-70—Vinyl ester epoxy resin.
DION® 9300-00—Flame retardant vinyl ester epoxy resin.
DION® 9800-00—Urethane modified vinyl ester resin.
POLYLITE® 31022-00—medium reactivity Isophthalic unsaturated polyester.
TTP—Total Time to Peak.

Sample Preparation

To 100 grams of a liquid thermosetting resin was added a predetermined amount of the copper compound, a quaternary ammonium or phosphonium copromoter, and a tertiary amine. All components were mixed and a free radical peroxide initiator was added to start the crosslinking (curing). A tongue depressor was used to periodically check for gelation of the resin. Once the resin gelled, the time was registered and a thermocouple was inserted into the resin to measure the exotherm generated from the curing reaction. The exotherm was recorded together with the time at the maximum temperature observed. Examples are presented in Tables 1-5.

Mechanical Properties

Mechanical properties were compared for samples cured with a Cu based promotion package of the present invention and a Cobalt Octoate concentration/(12 percent) dimethyl aniline (Cobalt/Amine promotion package). The samples were adjusted to have a gel time of approximately 20 minutes and clear castings were made to average 3.1 mm in thickness. The castings were cured at room temperature for 16 hours using 1.25% Methyl ethyl ketone peroxide (MEKPO) follow by post-curing for 4 hours at 65.5° C. (150° F.). Results are summarized in Table 6.

TABLE 1

Room Temperature Gel Times for Copper Napthenate, a Tertiary amine, a Quaternary Ammonium Salt, Unsaturated Polyesters and a Vinyl Ester.

|  | DION® 495-00 | | DION® 9102-70 | | 31051-00 | |
|---|---|---|---|---|---|---|
|  | 1 | 2 | 1 | 2 | 1 | 2 |
| 8% Copper NAP-ppm | 100 | 100 | 200 | 300 | 200 | 50 |
| DMPT, % | 0.2 | 0.2 | 0.2 | 0.2 | 0.2 | 0.1 |
| QUAT, % | 0.2 | 0.2 | 0.2 | 0.2 | 0.2 | 0.1 |
| CHP, % | 1.25 | — | 1.25 | — | 1.25 | — |
| MEKP, % | — | 1.25 | — | 1.25 | — | 1.25 |
| GEL TIME, min. | 3.8 | 4.2 | 15.2 | 23.2 | 4.7 | 6.5 |
| TTP, min. | 8.5 | 9.4 | 29.7 | 47.0 | 10.2 | 16.0 |
| EXOTHERM, ° C. | 212 | 215 | 183 | 144 | 182 | 176 |

TABLE 2

Room Temperature Gel Times for Tetraphenyl phosphine copper bromide, a Tertiary amine, a Quaternary Ammonium Salt and Unsaturated Polyesters.

| | POLYLITE® 31022-00 | | | | | | | |
|---|---|---|---|---|---|---|---|---|
|  | 1 | 2 | 3 | 4 | 5 | 6 | 7 | 8 |
| BrTTPPCu, ppm | 100 | 100 | 50 | 50 | 100 | 100 | 50 | 50 |
| DMPT, % | 0.2 | 0.2 | 0.2 | 0.2 | 0.1 | 0.1 | 0.1 | 0.1 |
| QUAT, % | 0.2 | 0.2 | 0.2 | 0.2 | 0.3 | 0.3 | 0.3 | 0.3 |
| CHP, % | 1.25 | — | 1.25 | — | 1.25 | — | 1.25 | — |
| MEKP, % | — | 1.25 | — | 1.25 | — | 1.25 | — | 1.25 |
| GEL TIME, min. | 4.1 | 2.5 | 4.1 | 2.3 | 6.2 | 4.4 | 7.3 | 3.6 |
| TTP, min. | 12.3 | 9 | 10.2 | 7.7 | 13.5 | 11.2 | 14.2 | 9.7 |
| EXOTHERM, ° C. | 219 | 220 | 220 | 220 | 218 | 218 | 219 | 220 |

TABLE 3

Room Temperature Gel Times using Bis-Triphenyl phosphine copper bromide with an Unsaturated Polyesters and a vinyl ester.

|  | DION® 9102-70 | | 31220-00 | |
|---|---|---|---|---|
|  | 1 | 2 | 1 | 2 |
| BisTPPCuBr, ppm | 50 | 100 | 100 | 100 |
| ATUR, % | 300 | 300 | — | — |
| DMAA | — | — | 0.3 | 0.3 |
| QUAT, % | 0.2 | 0.2 | 0.3 | 0.3 |
| CHP, % | 1.25 | — | 1.25 | — |
| MEKP, % | — | 1.25 | — | 1.25 |
| GEL TIME, min. | 45.1 | 15.7 | 17.0 | 8.8 |
| TTP, min. | 56.3 | 25.9 | 28.8 | 27.0 |
| EXOTHERM, ° C. | 173 | 174 | 195 | 188 |

TABLE 4

Room Temperature Gel Times for Copper Napthenate, a Tertiary amine, a Quaternary Ammonium Salt and Urethane Modified Vinyl Ester.

| | DION ® 9800-00 | | | | | | |
|---|---|---|---|---|---|---|---|
| | 1 | 2 | 3 | 4 | 5 | 6 | 7 |
| 8% Copper NAP-ppm | 1000 | 1000 | 300 | 300 | 1000 | 1000 | 1000 |
| DMPT, % | 0.10 | — | 0.10 | 0.10 | 0.10 | 0.20 | — |
| DMA, % | — | — | — | — | — | — | 0.20 |
| QUAT, % | — | 0.20 | 0.20 | 0.20 | 0.20 | 0.30 | 0.20 |
| CHP, % | 1.00 | 1.00 | 1.00 | 1.00 | 1.00 | 1.00 | 1.00 |
| WXP-126, % | — | — | — | 0.04 | — | — | — |
| GEL TIME, min. | >6 Hrs. | >6 Hrs. | 10.5 | 8.00 | 10.0 | 9.5 | 18 |
| TTP, min. | — | — | 28 | 18.5 | 32.5 | 30.8 | 50 |
| EXOTHERM, ° C. | — | — | 180.5 | 188 | 165.4 | 158 | 154 |

TABLE 5

Effect of Increasing Copper Napthanate Amount on the Gel Time on an Unsaturated Polyester.

| | DION ® 490-00 | | | |
|---|---|---|---|---|
| | 1 | 2 | 3 | 4 |
| 8% Copper NAP-ppm | 50 | 100 | 150 | 200 |
| DMPT, % | 0.20 | 0.20 | 0.20 | 0.20 |
| QUAT, % | 0.20 | 0.20 | 0.20 | 0.20 |
| CHP, % | 1.25 | 1.25 | 1.25 | 1.25 |
| GEL TIME, min. | 4.10 | 3.70 | 3.70 | 3.60 |
| TTP, min. | 9.30 | 9.00 | 9.00 | 9.90 |
| EXOTHERM, ° C. | 233 | 230 | 229 | 230 |

TABLE 6

Mechanical properties of resins comparing a Copper and Cobalt promotion package.

| | DION 490 | DION 490 | DION 9300 | DION 9300 | DION 9800 | DION 9800 |
|---|---|---|---|---|---|---|
| PROPERTY | Cu CURE | Co CURE | Cu CURE | Co CURE | CuCURE | Co CURE |
| HDT, ° C. | 124 | 111 | 96 | 99 | 105 | 104 |
| FLEX. STRENGTH, Psi. | 19,400 | 19,230 | 18,730 | 19,800 | 21,400 | 21,870 |
| FLEX. MODULUS, Kpsi. | 497 | 488 | 490 | 500 | 500 | 512 |
| TEN. STRENGTH, Psi. | 9,260 | 9,240 | 11,900 | 12,500 | 12,350 | 12,360 |
| TEN. MODULUS, Kpsi. | 40 | 39 | 470 | 480 | 495 | 495 |
| ELONGATION, % | 2.4 | 2.4 | 4.9 | 4.8 | 3.4 | 3.4 |

That which is claimed:

1. A room temperature curable cobalt-free resin composition comprising:
   a) a copper containing complex;
   b) a quaternary ammonium or phosphonium salt:
   c) an arylalkyl tertiary amine;
   d) optionally a transition metal salt; and
   e) an uncured thermosetting resin.

2. The room temperature curable cobalt-free resin composition of claim 1, wherein the copper containing complex is selected from the group consisting of one or more of:
   i)
   $$(Cu^{2+})(RCOO^-)_2$$
   wherein R is H, substituted or unsubstituted linear alkyl, substituted or unsubstituted branched alkyl, substituted or unsubstituted linear alkenyl, substituted or unsubstituted branched alkenyl, substituted or unsubstituted linear alkynyl, substituted or unsubstituted branched alkynyl, substituted or unsubstituted aryl, or substituted or unsubstituted alkylaryl;

ii)

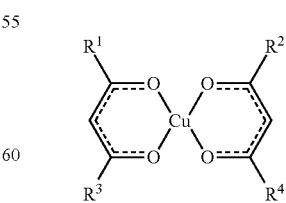

wherein m and n are each independently an integer of 0 or greater, and R' and R" are each independently H, substituted or unsubstituted linear alkyl, substituted or unsubstituted branched alkyl, substituted or unsubstituted linear alkenyl, substituted or unsubstituted branched alkenyl, substituted or unsubstituted aryl, or substituted or unsubstituted alkylaryl;

iii)

wherein $R^1$, $R^2$, $R^3$ and $R^4$ are each independently H, substituted or unsubstituted linear alkyl, substituted or unsubstituted branched alkyl, substituted or unsubstituted linear alkenyl, substituted or unsubstituted branched alkenyl, substituted or unsubstituted linear alkynyl, substituted or unsubstituted branched alkynyl, substituted or unsubstituted aryl, or substituted or unsubstituted alkylaryl; and
iv)

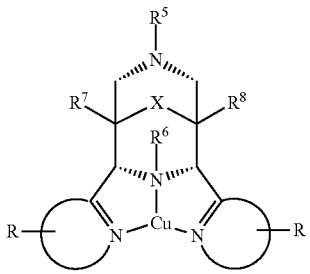

wherein $R^5$ and $R^6$ are each independently: a group containing a heteroatom capable of coordinating to a transition metal; a $C_1$-$C_{22}$ substituted or unsubstituted alkyl; a $C_6$-$C_{10}$ aryl, wherein at least one of $R^5$ and $R^6$ is a non-aromatic hydrocarbon group, the non-aromatic hydrocarbon group being a $C_8$-$C_{22}$ alkyl chain, $R^7$ and $R^8$ are independently: H; $C_1$-$C_4$ alkyl; phenyl; electron withdrawing groups; and reduced products and derivatives thereof, X is selected from: C=O; a ketal derivative of C=O; a thioketal derivative of C=O; and —[C($R^7$)$_2$]$_y$—, wherein y is 0 or 1 and $R^7$ are each independently selected from H, OH, O—$C_1$-$C_{24}$ alkyl, O-benzyl, O—(C=O)—$C_1$-$C_{24}$ alkyl and $C_1$-$C_{24}$ alkyl, and wherein R are each independently $C_1$-$C_4$ alkyl.

3. The room temperature curable cobalt-free resin composition of claim 1, wherein the copper containing complex comprises:

($Cu^{2+}$)($RCOO^-$)$_2$ wherein R is H, substituted or unsubstituted linear alkyl, substituted or unsubstituted branched alkyl, substituted or unsubstituted linear alkenyl, substituted or unsubstituted branched alkenyl, substituted or unsubstituted linear alkynyl, substituted or unsubstituted branched alkynyl, substituted or unsubstituted aryl, or substituted or unsubstituted alkylarl.

4. The room temperature curable cobalt-free resin composition of claim 1, wherein the copper containing complex comprises:

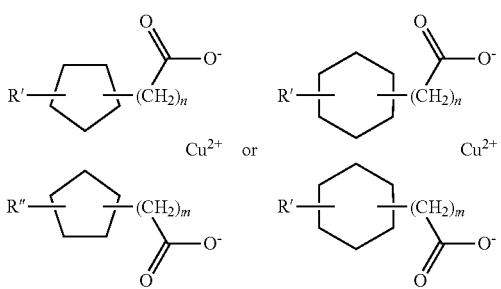

wherein m and n are each independently an integer of 0 or greater, and R' and R" are each independently H, substituted or unsubstituted linear alkyl, substituted or unsubstituted branched alkyl, substituted or unsubstituted linear alkenyl, substituted or unsubstituted branched alkenyl, substituted or unsubstituted linear alkynyl, substituted or unsubstituted branched alkynyl, substituted or unsubstituted aryl, or substituted or unsubstituted alkylaryl.

5. The room temperature curable cobalt-free resin composition of claim 1, wherein the copper containing complex comprises:

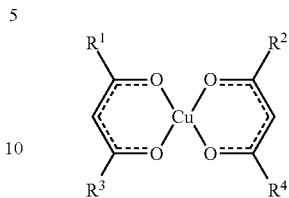

wherein R, $R^2$, $R^3$ and are each independently H, substituted or unsubstituted linear alkyl, substituted or unsubstituted branched alkyl, substituted or unsubstituted linear alkenyl, substituted or unsubstituted branched alkenyl, substituted or unsubstituted aryl or substituted or unsubstituted alkylaryl.

6. The room temperature curable cobalt-free resin composition of claim 1, wherein the copper containing complex comprises:

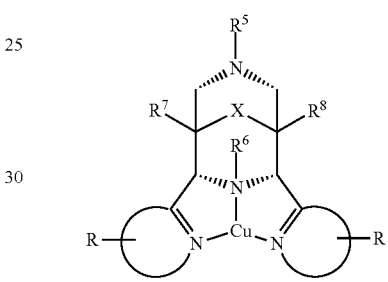

wherein $R^5$ and $R^6$ are each independently: a group containing a heteroatom capable of coordinating to a transition metal; a $C_1$-$C_{22}$ substituted or unsubstituted alkyl; a $C_6$-$C_{10}$ aryl, wherein at least one of $R^5$ and $R^6$ is a non-aromatic hydrocarbon group, the non-aromatic hydrocarbon group being a $C_8$-$C_{22}$ alkyl chain, $R^7$ and $R^8$ are independently: H; $C_1$-$C_4$ alkyl; phenyl; electron withdrawing groups; and reduced products and derivatives thereof, X is selected from: C=O; a ketal derivative of C=O; a thioketal derivative of C=O; and —[C($R^7$)$_2$]$_y$—, wherein y is 0 or 1 and $R^7$ are each independently selected from H, OH, O—$C_1$-$C_{24}$ alkyl, O-benzyl, O—(C=O)—$C_1$-$C_{24}$ alkyl and $C_1$-$C_{24}$ alkyl, and wherein R is $C_1$-$C_4$ alkyl.

7. The room temperature curable cobalt-free resin composition of claim 1, further comprising a peroxide initiator, wherein the peroxide initiator is selected from the group consisting of cumene hydroperoxide, methyl ethyl ketone peroxide, benzoyl peroxide, 2,4-pentanedione peroxide, 2,5-dimethylhexane-2,5-dihydroperoxide, tert-butyl peroxybenzoate, di-tert-butyl perphthalate, dicumyl peroxide, 2,5-dimethyl-2,5-bix (tert-buty peroxide)hexane, 2,5-dimethyl-2, 5-bis (tert-butylperoxy)hexyne, bis (tert-butylperoxyisopropyl) benzene, ditert-butyl peroxide, 1,1-di (tert-amylperoxy)-cyclohexane, 1,1-di-(tert-butylperoxy)-3, 3,5-trimethylcyclohexane, 1,1-di-(tert-butylperoxy)-cyclohexane, 2,2-di-(tert-butylperoxy)butane; n-butyl-4,4-di(tert-butyl peroxy)valerate, ethyl-3,3-di-(tert-amylperoxy) butyrate, ethyl-3,3-di(tert-butylperoxy)-bury rate, t-butyl peroxy-neodecanoate, di-(4-5 butyl-cyclohexyl)-peroxydicarbonate, lauryl peroxide, 2,5-dimethyl-2,5-bis(2-ethylhexanoyl peroxy) hexane, t-amyl peroxy-2-ethylhexanoate;

2,2'-azobis(2-methylpropionitrile), 2,2'-azobis(2,4-methylbutanenitrile), and mixtures of any thereof.

8. The room temperature curable cobalt-free resin composition of claim 1, wherein the quaternary ammonium or phosphonium salt is selected from the group consisting of tetramethylammonium chloride, tetramethylammonium hydroxide, tetramethylammonium bromide, tetramethylammonium hydrogensulfate, benzyltrimethylammonium chloride, benzyltrimethylammonium bromide, benzyltrimethylammonium hydrogen sulfate, benzyltributylammonium chloride, benzyltributyl ammonium bromide, tetrabutylphosphonium acetate, tetrabutylphosphonium bromide, tetrabutylphosphonium chloride, tetrabutylphosphonium fluoride, tetrabutylphosphonium iodide, tetraphenylphosphonium chloride, tetraphenylphosphonium bromide, tetraphenylphosphonium acetate.

9. The room temperature curable cobalt-free resin composition of claim 1, wherein the uncured thermosetting resin is selected from the group consisting of a polyester resin, a vinyl ester resin, a urethane acrylate resin, and a vinyl hybrid resin.

10. The composition of claim 1, wherein the composition comprises the transition metal salt.

\* \* \* \* \*

UNITED STATES PATENT AND TRADEMARK OFFICE
CERTIFICATE OF CORRECTION

PATENT NO. : 10,000,602 B2
APPLICATION NO. : 14/858604
DATED : June 19, 2018
INVENTOR(S) : Hildeberto Nava et al.

It is certified that error appears in the above-identified patent and that said Letters Patent is hereby corrected as shown below:

In the Specification

Column 6, Line 26, " 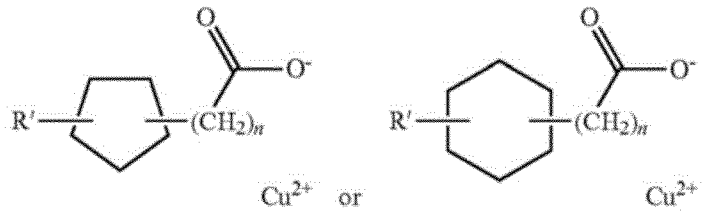 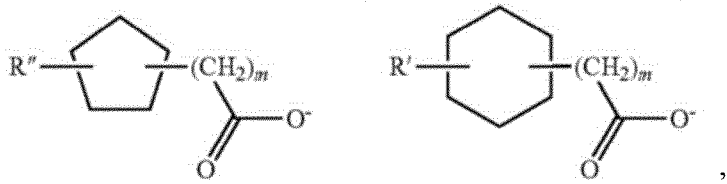 "

Should be changed to: -- 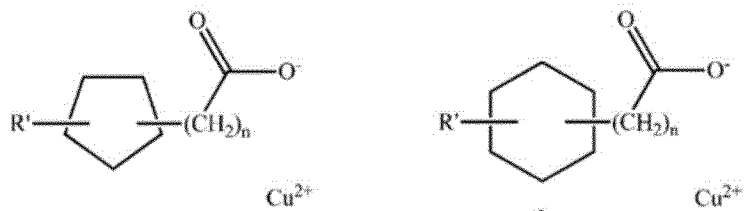 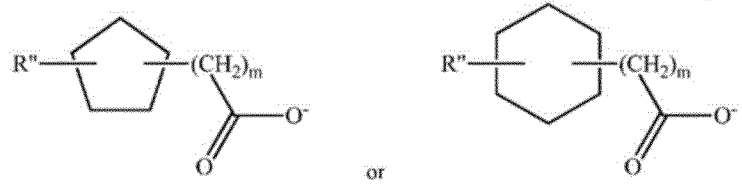 --.

Signed and Sealed this
Nineteenth Day of March, 2019

Andrei Iancu
*Director of the United States Patent and Trademark Office*

CERTIFICATE OF CORRECTION (continued)
U.S. Pat. No. 10,000,602 B2

Column 20, Line 21, " 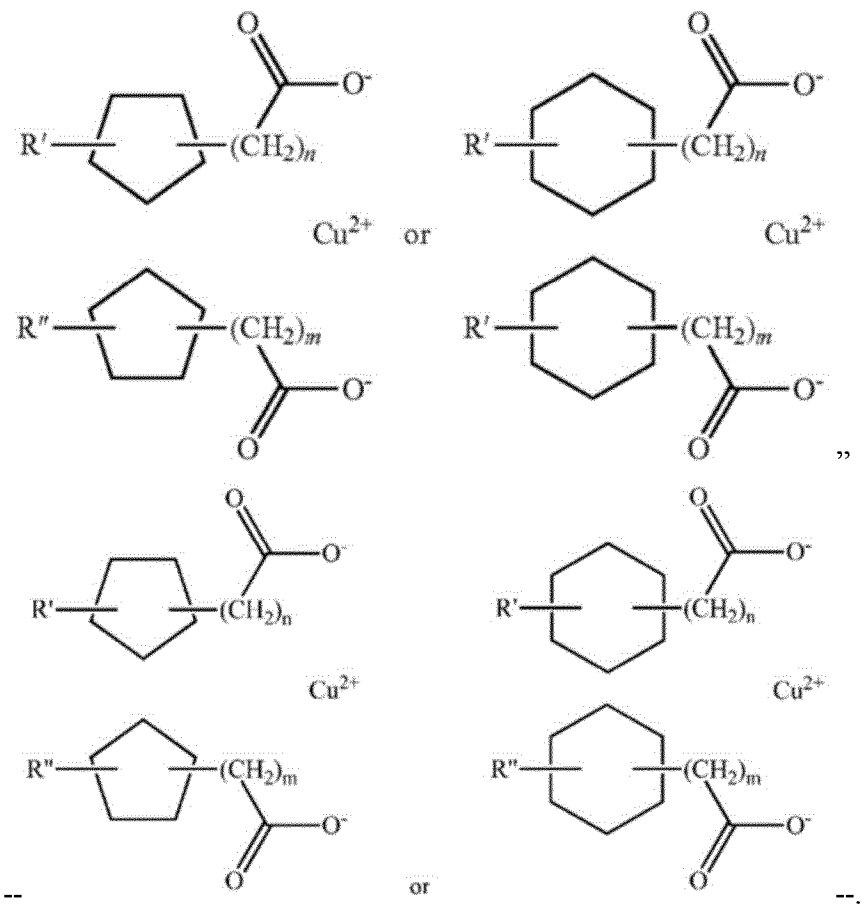 "

Should be changed to: -- -- .

Column 21, Line 46, " 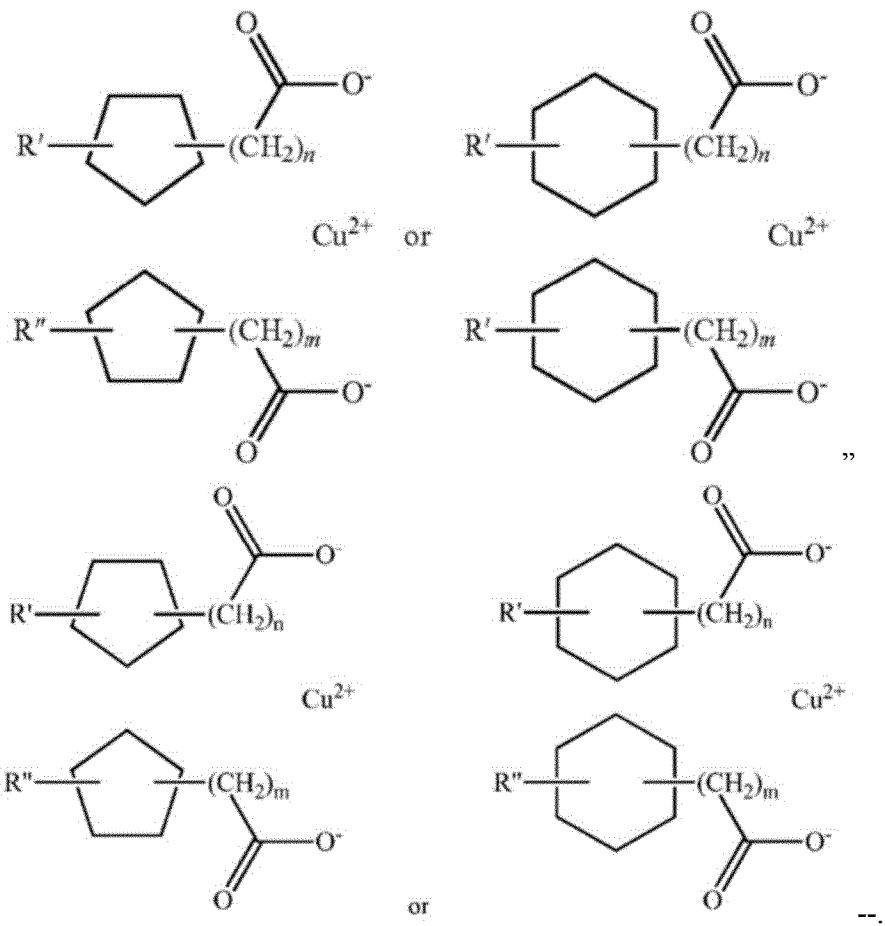 "
Should be changed to: -- --.
In the Claims
Column 22, Line 14, "and are each" should be changed to --are R' are each--.
Column 22, Line 64, "-bury rate" should be changed to --buty rate--.